United States Patent
Bot

(10) Patent No.: US 8,331,900 B2
(45) Date of Patent: Dec. 11, 2012

(54) METHOD AND SYSTEM FOR ADDING INFORMATION TO AN EMERGENCY CALL

(75) Inventor: Johannes Jan Bot, Nieuwendijk (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 292 days.

(21) Appl. No.: 12/673,572

(22) PCT Filed: Aug. 15, 2007

(86) PCT No.: PCT/EP2007/058459
§ 371 (c)(1), (2), (4) Date: Feb. 15, 2010

(87) PCT Pub. No.: WO2009/021556
PCT Pub. Date: Feb. 19, 2009

(65) Prior Publication Data
US 2011/0105076 A1 May 5, 2011

(51) Int. Cl.
*H04M 11/04* (2006.01)
(52) U.S. Cl. .................. 455/404.2; 455/404.1
(58) Field of Classification Search .............. 455/404.1, 455/404.2, 456.1–456.6, 403, 445, 457, 560, 455/433, 435.1, 436, 407, 410, 418, 419, 455/550.1
See application file for complete search history.

(56) References Cited

U.S. PATENT DOCUMENTS

| | | | |
|---|---|---|---|
| 6,078,804 A | 6/2000 | Alperovich et al. | |
| 6,256,489 B1 * | 7/2001 | Lichter et al. | 455/404.2 |
| 6,332,074 B1 * | 12/2001 | Spitaletta et al. | 455/407 |
| 6,343,212 B1 * | 1/2002 | Weber et al. | 455/404.1 |
| 6,408,172 B1 | 6/2002 | Alperovich et al. | |
| 6,681,107 B2 * | 1/2004 | Jenkins et al. | 455/412.1 |
| 6,721,542 B1 * | 4/2004 | Anttila et al. | 455/68 |
| 7,590,405 B2 * | 9/2009 | Ewell, Jr. | 455/404.1 |
| 2002/0198005 A1 * | 12/2002 | Hilton et al. | 455/456 |
| 2004/0176123 A1 | 9/2004 | Chin et al. | |
| 2005/0053209 A1 * | 3/2005 | D'Evelyn et al. | 379/111 |
| 2005/0070315 A1 | 3/2005 | Rai et al. | |
| 2007/0232328 A1 | 10/2007 | Kramarz-Von Kohout | |

FOREIGN PATENT DOCUMENTS

| | | |
|---|---|---|
| DE | 19957651 A1 | 5/2001 |
| EP | 1361774 A | 11/2003 |

* cited by examiner

*Primary Examiner* — Melody Mehrpour
(74) *Attorney, Agent, or Firm* — Roger S. Burleigh

(57) ABSTRACT

A method and system, for adding emergency information to an emergency call, network transport of the emergency information and display to an emergency center operator. Emergency information may comprise; position indication, ability to voice answer, indication of accompanying SMS, automated alarm etc. and is added as postfix to the emergency number by the phone as shown in FIG. 3. The network entry node takes care of separation of dialled emergency number and emergency information, to enable normal set-up of the emergency call connection trough the network to the emergency center where the emergency information is presented to the emergency operator.

17 Claims, 3 Drawing Sheets

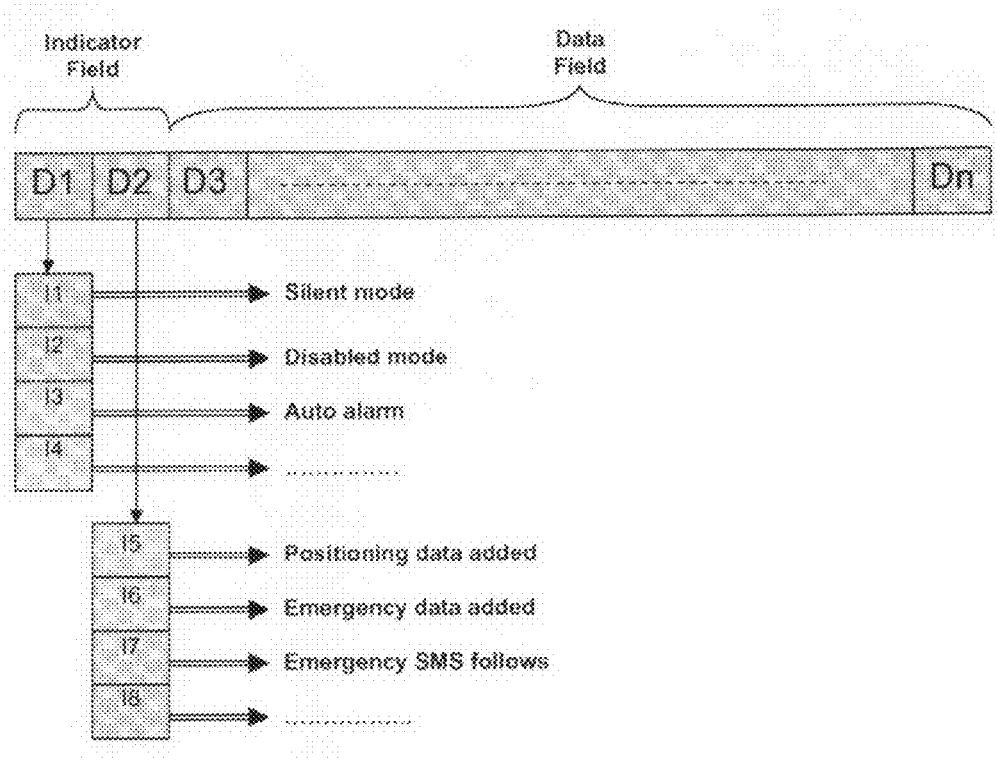

METHOD AND SYSTEM FOR ADDING INFORMATION TO AN EMERGENCY CALL

FIELD OF THE INVENTION

The present invention relates generally to emergency calls in communications systems comprising; mobile terminals and a radio network infrastructure, fixed line phones, network nodes, emergency centres and a land based transport network. More particularly, the present invention facilitates a method and system for adding emergency related information to an emergency call.

BACKGROUND OF THE INVENTION

The elements involved in setting up a standard emergency call are described in FIG. 1. A user of a phone, being either a mobile phone 1a with a radio connection or a fixed phone 1b with a fixed line connection, enters the emergency number.

In case of a mobile phone the number is transported as a DTAP-IAM (Direct Transfer Application Part-Initial Address Message) 2a to the MSC (Mobile Switching Centre). The Emergency Call Handler (ECH) function 4 receives the DTAP-IAM with the emergency number and is further responsible for setting-up the call to the Emergency Centre (PSAP—Public Safety Answering Point) 7 through the network 6. It therefore sends an ISUP-IAM (ISDN User Part-Initial Address Message) 5 into the network 6.

In case of a fixed phone the number is transported as DTMF (Dual Tone Multiple Frequency) 2b to a local exchange 3b. The Emergency Call Handler (ECH) function 4 receives the emergency number and is further responsible for setting-up the call to the Emergency Centre 7.

The PSAP receives the ISUP-IAM and the information 8 in the ISUP-IAM is provided to the Emergency Operator 9, who acknowledges and the connection between user and operator is established.

The information related to the emergency is communicated orally between the user end the emergency operator. For some disabled people like deaf/mute, this is very cumbersome, and, as always in stress situations, people might not remember information requested by the emergency operator. In case of automated alarms like for fire or burglary, no voice communication is possible. And finally there are situation like where a burglar is in the house and you certainly would not use your voice to answer questions of the emergency operator, moreover even the voice of the operator from the speaker is unwanted.

In recent years several additions are made to the prior art that allow the operator to retrieve additional information. Example is U.S. Pat. No. 6,256,489 where the operator is facilitated with the possibility to retrieve the actual location of a mobile phone.

Drawback of these methods is that information needs to be stored in a separate database and is related to the phone number rather then the actual user or usage. If in emergency cases a speech/hearing disabled person uses a phone, the fact that he or she is unable to give a voice response will not be in the database when it is not the regular extension number. A comparable problem occurs when a person can not speak back e.g. when hiding for a burglar.

The object of this invention is to add emergency related information to an emergency call made.

SUMMARY OF THE INVENTION

The solution is provided with the current invention;

Where a phone adds the emergency information in a postfix to an entered emergency number, and a network entry node removes the postfix again and stores it in a special parameter field of an ISUP-IAM message, and an emergency centre extracts the emergency information from the special parameter field and displays it to the emergency operator, Where the phone is capable of sending automatically an emergency SMS, to the same emergency number, with further emergency information, Where the phone is capable to switch itself to silent mode after detecting an emergency number followed by first one or more additional digits, Where the phone is capable to switch itself to disabled mode after detecting an emergency number followed by second one or more additional digits, Where the phone is capable to distinguish between emergency calls made by a person or an automated system, Where the postfix comprises an indicator field having bit positions for emergency related fact indications, and a data field for emergency related data.

BRIEF DESCRIPTION OF THE DRAWINGS

FIG. 5 presents postfix examples.

DETAILED DESCRIPTION

Figure 1:
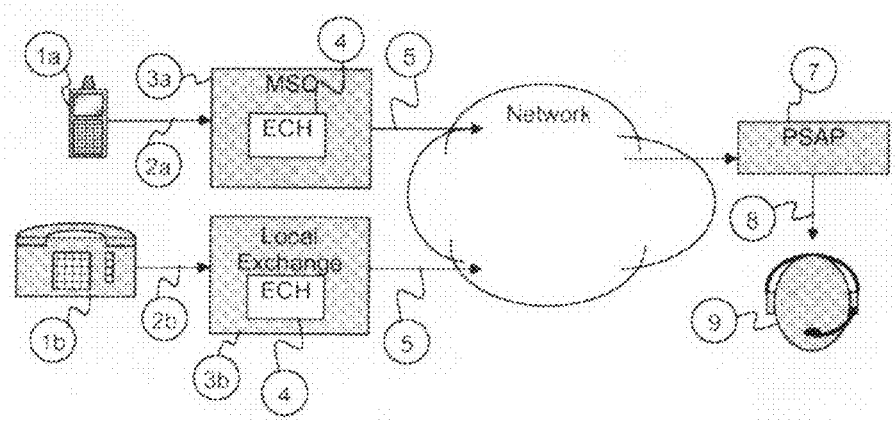
FIG. 1 presents the state of the art elements involved in an emergency call.
Figure 2:
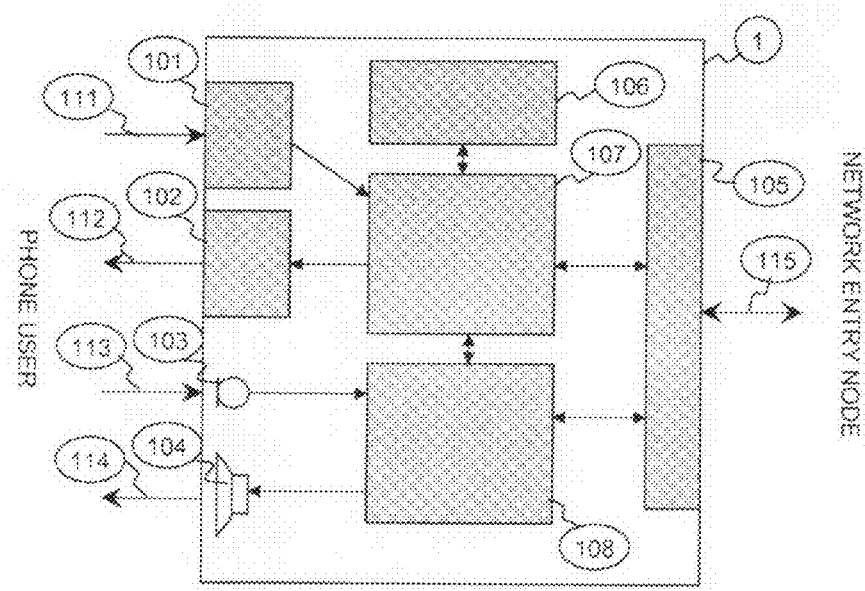
FIG. 2 presents the state of the art generic phone,
FIG. 3 present the sequence of steps for transport of emergency information with the emergency call.

FIG. 2 outlines a state of the art phone 1. The state of the art phone has data entry means 101 via which the user can enter data 111. The data entry means may comprise numeric or alpha numeric keyboards, special function buttons or even a touch screen. It has further display and signalling means 102 providing visual, audible or even vibration feedback 112 to the user. The phone has further a microphone 103 for user or surrounding audio 113 and a speaker 104 providing audio 114 to the user.

The interface 105 towards the network entry node depends of the type of phone. In case of a GSM mobile phone it comprises a radio interface providing the connection to the MSC as network entry node. The connection 115 comprises DTAP (Direct Transfer Application Part), PCAP (Positioning Calculation Application Part) etc. for signalling and PCM (Pulse Code Modulated) audio.

In case of a fixed line phone the interface 105 consists of line drivers/receivers for analogue connection to a local exchange as network entry node. Signalling is transmitted as DTMF, while audio is analogue.

Further elements of the phone are a processing means 107 executing phone functions, a memory 106 containing data, and audio circuitry 108.

Figure 3:
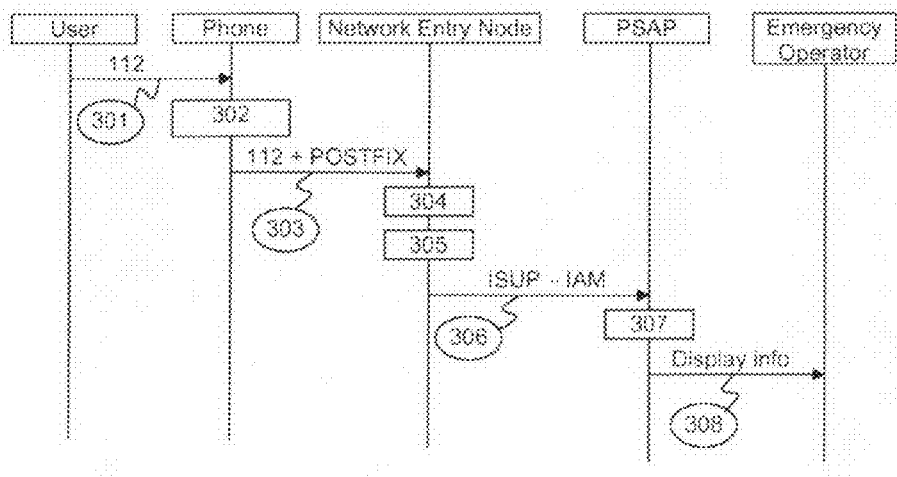
Figure 4:
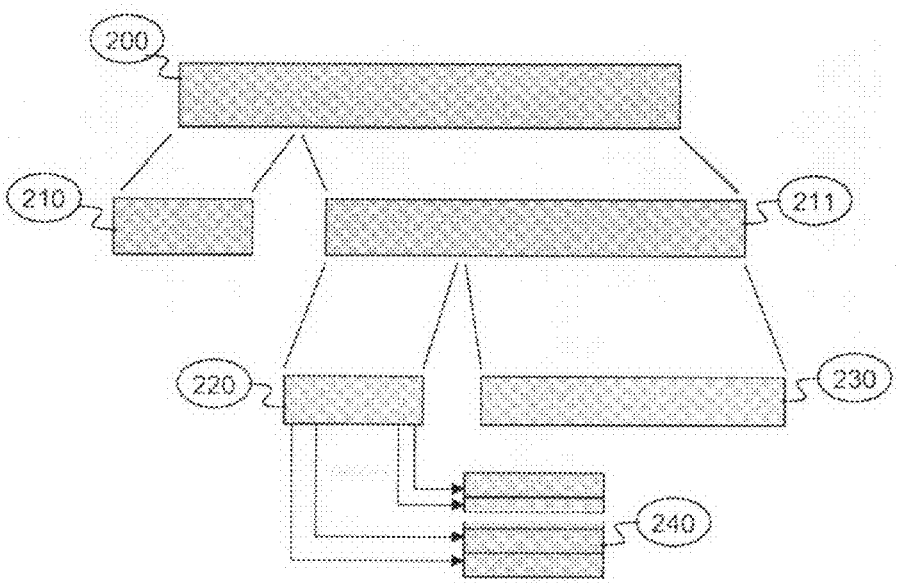
FIG. 4 presents a breakdown of combined emergency number and postfix.

FIGS. 3 and 4 outline the basics of the invention. The emergency information is added 302, by the emergency routine executed by the processing means 107 in the phone, as a postfix 211 to the dialled emergency number 210 like "112" or "911" by a user of the phone. The combined emergency number and postfix 200 is sent to a network entry node. The actual details of this operation differ slightly between a mobile phone 1a and a fixed phone 1b.

In case of a mobile phone the user enters the emergency number 301 and presses the 'send' key to initiate setting-up connection. The phone internal software executed by the processing means stores the digits in the requested number field of a DTAP-IAM 2a. The internal software detects that the digits equal an emergency number and starts the emergency routine. The emergency routine adds emergency information in a postfix that it stores in the requested number field of a DTAP-IAM 2a behind the emergency number. Then the phone sends 303 the complete sequence contained in the DTAP-IAM to the as network entry node. Number analysis in the MSC 3a detects the presence of an emergency number in the requested number field, by the first digits. It therefore hands the complete contents of the requested number field to the ECH 4.

In case of a fixed phone 1b the user enters the digits of the emergency number one by one 301 after picking up the horn. The phones internal software executed by the processing means 107 transmits 303 each digit as DTMF to the Local Exchange 3b as network entry node. By detecting a digit sequence resembling an emergency number, the phone's internal software starts the emergency routine. The emergency routine assembles the postfix with emergency information and transmits 303 this as a DTMF sequence behind the digits already transmitted. Number analysis in the Local Exchange receives the digits one by one. After the first digits number analysis detects that the first digits comprise an emergency number. The already received digits are handed over to the ECH 4 that takes further action. The ECH receives all further digits transmitted as DTMF to the Local Exchange. By analysing the already received digits the ECH knows how many digits are there to follow. When the complete sequence is received the ECH starts with setting-up the emergency connection.

Modern fixed line phone systems like home DECT have a user interface like a mobile phone. All digits are entered and then "send" is to be pressed to initiate connection. On the other hand digits are transmitted to the Local Exchange in DTMF as for a normal fixed phone.

Setting-up the connection and further handling are independent of mobile or fixed. The ECH acts on the complete sequence 200 comprising requested number 210 and postfix 211 as copied from the requested number field of the DTAP-IAM or from the received sequence of digits via DTMF. The ECH has to prepare an ISUP-IAM for setting-up the connection. It therefore removes 304 the postfix 211 from the complete sequence 200 before the requested number 210 is copied into the called party number field of the ISUP-IAM. The Postfix 211 it self is copied into an optional parameter field of the ISUP-IAM by the ECH. The ECH sets a code for additional emergency data in an optional parameter code field, and sets an optional parameter length field with the length of the postfix. Then the completed ISUP-IAM 5 is sent 306 into the network that takes care of routing the ISUP-IAM to the emergency centre 7. The emergency centre receives 306 the contents of the ISUP-IAM extracts 307 the emergency information from the postfix in the optional parameter field and displays 308 the information 8 to the operator 9.

In an embodiment the postfix 211 comprises an indicator field 220 and a data field 230. The indicator field comprises single bit positions 240 for flags indicating the type of emergency information added to an emergency call as well as special circumstances related to the emergency call.

The features of the invention are described by means of a series of embodiments. It shall be appreciated that numerous other uses can be made of the current invention with out departing from the basic idea of the invention.

A first embodiment relates to sending the actual GPS position of a user together with an emergency call without the burden of interrogation of databases or other network nodes. It therefore relates only to mobile phones having connection to or embedded GPS device. When an emergency call is made with the mobile phone, the phone adds its actual GPS position to the emergency number as a postfix.

When the user enters the digits for the emergency number via 101, a routine in the processing means 107 detects that an emergency call is made and retrieves the GPS information from the embedded or connected GPS receiver and stores the information in the data field 230 of the postfix. It sets the GPS info added flag in the indicator field 220.

The routine adds the postfix to the dialled emergency number and send it towards the MSC 3a. Further handling is identical to the procedure as described in the introduction.

A second embodiment relates to emergency data like your own physician, who to contact, Allergy, medication use, etc. This embodiment also relates only to mobile phones as the information is person related and the fact that an SMS is used for transporting the information.

A user of the mobile phone has prepared the SMS with emergency data and stored it in the phone's memory 106. When the user enters the digits for the emergency number via 101, a routine in the processing means 107 detects that an emergency call is made. It either adds the emergency data autonomous or prompts first with a question to add, requiring the user to press yes after entering the emergency number.

A routine in the processing means 107 prepares a postfix to the emergency number. The data field of the postfix is left empty as the data is send as SMS with the emergency call. The processing means sets the emergency information added flag as well as the SMS follows flag in the indicator field 230. The routine adds the postfix to the dialled emergency number and send the complete sequence 200 towards the MSC 3a. Further handling is identical to the procedure as described in the introduction.

The SMS send simultaneously is also received by the MSC 3a and forwarded directly to the emergency centre 7 comparable to a normal SMS.

As the operator is informed by the SMS follows flag and the emergency data flag, he will look at a received SMS from the same number or such is arranged by the emergency centre software and the SMS contents is displayed together with the emergency call data when the SMS arrives.

A third embodiment relates to operation in silent mode. In situations like someone has entered the house, you want to place an emergency call, but not to speak or that any sound is made by the speaker of the phone. Also the key pressed feedback is unwanted. This third embodiment has 2 variants depending on the capability to have an SMS conversation with the emergency centre, basically the difference between a fixed and a mobile phone.

When the user enters the digits for the emergency number via 101 he adds an additional digit to indicate silent mode, like "112 0" instead of "112". The emergency routine in the processing means 107 is triggered by the first digits comprising the emergency number. The additional digit entered signals that an emergency call has to be made in silent mode. The audible key pressed feedback is switched off and the phone speaker is disabled or turned to very low volume. Optional call in progress or line occupied indicators are turned off and display brightness is low or off. When capable of sending and receiving SMS also the audible alarm of sending or receiving SMS is disabled.

The emergency routine sets the silent mode, no voice back, flag in the indicator field 220 of the postfix 211. If the phone is capable of sending SMS also the SMS follows flag is set. The routine adds the postfix to the dialled emergency number excluding the additional digit and sends the combined sequence 200.

If the phone is capable of sending an SMS, the routine in the processing means 107 prepares an empty SMS towards the same emergency number. The user can enter emergency text and press "send". The SMS with emergency text is sent to the emergency centre 7 like comparable to an ordinary SMS. The emergency operator 9 is informed that the emergency call is made in silent mode by the represented content of the indicator field. When also the flag SMS follows is shown the operator is informed that he can have an SMS conversation. The emergency centre software shall preferably support interactive SMS dialogue, display with the emergency call information and without the need of re-entering the party number.

A fourth embodiment relates to the third embodiment in that voice communication will be problematic. In certain cases a person making an emergency call will not be able to speak or to hear due to injuries or by disabled speech or hearing. In these cases the measures taken for silent mode are not required. The speaker volume in the contrary would best be set to maximum and the display to maximum contrast. An indication shall be given to the emergency operator that full voice conversation is not possible. Basically this embodiment is for both fixed and mobile phones with the addition that for mobile phones SMS sequences might be used to compensate for voice conversation.

When the user enters the digits for the emergency number via 101 he adds an additional digit to indicate disabled mode, like "112 1" instead of "112". The emergency routine in the processing means 107 is triggered by the first digits. The additional digit entered signals that an emergency call has to be made in disabled mode. The phone speaker volume is set to maximum. Optional display brightness is set for maximum contrast.

The emergency routine sets the disabled mode flag in the indicator field 220 of the postfix 211. If the phone is capable of sending SMS also the SMS follows flag is set. The routine adds the postfix 211 to the dialled emergency number 210 excluding the additional digit and sends the combined sequence 200.

If the phone is capable of sending an SMS, the routine in the processing means 107 prepares an empty SMS towards the same emergency number. The user can enter emergency text and press "send". The SMS with emergency text is sent to the emergency centre 7 comparable to an ordinary SMS. The emergency operator 9 is informed that the emergency call is made in disabled mode by the represented content of the indicator field. When also the flag SMS follows is shown the operator is informed that he can have an SMS conversation. The emergency centre software shall preferably support interactive SMS dialogue, display with the emergency call information and without the need of re-entering the party number.

A fifth embodiment relates to automated alarm systems at remote locations using a mobile phone to give a fire, entering, etc. alarm to an emergency centre. Automated alarm systems can be seen as "non human" users. Specific for this embodiment is that the processing means 107 in the phone has a direct connection with the alarm means not using the entry means 102. This direct connection can be infrared, Bluetooth, USB or the like. The automated alarm initiates the emergency call and also provides a text string describing the emergency in more detail.

When the automated alarm sends the digits for the emergency number, a routine in the processing means 107 detects that an emergency call is made. As the digits are not received from the entry means 101 the routine sets the automated alarm flag in the indicator field 220 as well as the SMS follows flag.

The routine adds the postfix to the dialled emergency number and send it towards the MSC 3a.

Following sending the emergency call the phone enters the received text string into an SMS and sends the SMS to the same emergency number like any ordinary SMS. As in previous embodiments the information is presented to the emergency operator.

This embodiment can also be used for an emergency talisman as elderly or disabled people wear to place an emergency call when they are not able to reach there phone.

A sixth embodiment relates to emergency data like in the second embodiment but can now be used by both fixed and mobile phones. For this embodiment the emergency data itself is not stored in the phone but in a separate database accessible by the user true the internet. The database application provides the user with a key that can be used for updating the information in the database. This numeric key is stored by the user in the phone's memory 106.

When the user enters the digits for the emergency number via 101, a routine in the processing means 107 detects that an emergency call is made. In case of a fixed phone the routine sets the emergency information added flag in the indicator field 230. The numeric key is fetch from the memory 106 and stored in the data field 230 of the postfix 211. The phone sends the whole sequence 200 as DTMF sequence to the local exchange 3b as network entry node.

In case of a mobile phone the user is first prompted if he wants to send the emergency data with his emergency call, requiring the user to press yes after entering the emergency number. Sending the emergency data numeric key with the emergency call overrides the position information added as in the first embodiment. The routine in the processing means 107 prepares a postfix to the emergency number. The numeric key is copied from the memory 106 to the data field 230 of the postfix 211. The processing means sets the emergency information added flag in the indicator field 230. The routine adds the postfix to the dialled emergency number and send the complete sequence 200 towards the MSC 3a.

Alternatively a user can enter a numeric key directly after the emergency number. This is especially advantageous if the person uses a phone that is not his own. The phone detecting a number sequence after the emergency number then uses the provided numeric key and not the one stored in the phones memory.

Preferably the emergency centre software detects that the emergency data added flag is set without the SMS follows flag set. The emergency centre software extracts the key from the data field 230 of the postfix and addresses the data base for retrieving the information. The emergency centre software displays the information with the emergency call information to the operator.

FIG. 5 shows an example of a postfix for which some examples will be given according to the described embodiments.

For the first embodiment 080*5806381#10112129 means:
0: no special mode,
8: position data added, no additional SMS, no emergency data
0 LAT/LONG position information
*5806381: Lat N 58 06' 38.1"
10112129: Long E 101 12' 12.9"

For the second embodiment 0*0*5806381*10112129 means:
0: no special mode,
*: position data added, with additional SMS, with emergency data
0: LAT/LONG position information
*5806381: Lat N 58 06' 38.1"
*10112129: Long W 101 12' 12.9"
For the third embodiment 82 means;
8: silent mode
2: SMS follows, no position data or emergency data added.
For the fourth embodiment 46971002451 means:
4: disabled mode,
6: numeric emergency data key added, SMS follows
971002451: Numeric key indicating a location where to fetch standard stored emergency data.
For the fifth embodiment 2*0#5806381#10112129 means:
2: automated alarm mode
*: position data added and SMS follows
0: LAT/LONG position information
5806381: Lat S 58 06' 38.1"
10112129: Long E 101 12' 12.9"

The invention claimed is:

1. A method for making an emergency call from a phone via a network entry node to an emergency centre, comprising the steps of:
   Adding emergency information in a postfix to an emergency number when the emergency number is entered;
   Sending the emergency number with the postfix to the network entry node;
   Receiving an emergency number with the postfix by the network entry node;
   Removing the postfix from the emergency number with the postfix;
   Adding the postfix to an optional parameter field in an ISDN User Part-Initial Address Message;
   Sending the ISDN User Part-Initial Address Message for setting up the connection to the emergency centre;
   Receiving the contents of the ISDN User Part-Initial Address Message for setting up the connection to the emergency centre, by the emergency centre;
   Extracting the emergency information in the postfix in the optional parameter field; and,
   Displaying the emergency information to an emergency operator.

2. The method of claim 1, further comprising the steps of:
   Entering an emergency number followed by a first one or more additional digits by a user;
   Setting the phone's audible and visual means to silent mode, when detecting the emergency number followed by the first one or more additional digits by the phone;
   Setting a silent mode indicator in the emergency information; and,
   Removing the first one or more digits from the emergency number.

3. The method of claim 1, further comprising the steps of:
   Entering an emergency number followed by a second one or more additional digits by a user;
   Setting the phone's audible and visual means to disabled mode, when detecting the emergency number followed by the second one or more additional digits by the phone;
   Setting a disabled mode indicator in the emergency information; and,
   Removing the second one or more digits from the emergency number.

4. The method of claim 2, for phones capable of sending SMS messages, further by comprising the steps of:
   Preparing an emergency information SMS to the emergency number, by the phone;
   Setting an emergency information SMS follows indicator in the emergency information;
   Entering emergency text into the emergency information SMS, by the user; and,
   Sending the emergency information SMS by the phone.

5. The method of claim 1, for phones capable of sending SMS messages, further comprising the steps of:
   Preparing an emergency information SMS to the emergency number from an emergency information text string in the phone's memory, by the phone;
   Setting an emergency information SMS follows indicator in the emergency information;
   Setting an emergency information data added indicator in the emergency information; and,
   Sending the emergency information SMS.

6. The method of claim 1, further comprising the steps of:
   Retrieving an emergency information key from the phone's memory, by the phone;
   Storing the emergency information key in the emergency information; and,
   Setting an emergency information data added indicator in the emergency information.

7. The method of claim 1, for phones having an embedded, or connected with a, position information receiver, further comprising the steps of:
   Retrieving position information from the position information receiver, by the phone;
   Storing the position information in the emergency information; and,
   Setting a position information data added indicator in the emergency information.

8. The method of claim 1, for phones having connection with an automated alarm system and capable of sending SMS messages, further comprising the steps of:
   Detecting that the user is an automated alarm system, by the phone;
   Setting an automated alarm indicator in the emergency information;
   Preparing an emergency information SMS to the emergency number;
   Receiving an emergency information text string from the automated alarm;
   Storing the emergency information text string into the emergency information SMS;
   Setting an emergency information SMS follows indicator in the emergency information;
   Setting an emergency information data added indicator in the emergency information; and,
   Sending the emergency information SMS.

9. A phone comprising data entry means, data display means, memory, processing means, audio input and output means, and interface towards a network entry node, wherein the processing means is adapted to add emergency information in a postfix to an emergency number when an emergency call is made.

10. The phone as claimed in claim 9, wherein the processing means is adapted to send an emergency SMS with an emergency call to the same emergency number.

11. The phone as claimed in claim 9, wherein it has dedicated entry means for setting silent mode.

12. The phone as claimed in claim 9, wherein it has dedicated entry means for setting disabled mode.

13. The phone as claimed in claim 9, wherein the memory is adapted to store an emergency information text string.

14. The phone as claimed in claim 9, wherein the memory is adapted to store an emergency information key.

15. A network entry node having an Emergency Call Handling function, wherein the Emergency Call Handling function is adapted to remove a postfix from a received emergency number with postfix and store the postfix in an optional parameter field of an ISDN User Part Initial Address Message sent into the network.

16. The network entry node recited in claim 15, wherein said network entry node is a Mobile Switching Centre.

17. The network entry node recited in claim 15, wherein said network entry node is a Local Telephony Exchange.

* * * * *

UNITED STATES PATENT AND TRADEMARK OFFICE
CERTIFICATE OF CORRECTION

PATENT NO. : 8,331,900 B2  
APPLICATION NO. : 12/673572  
DATED : December 11, 2012  
INVENTOR(S) : Bot Page 1 of 1

It is certified that error appears in the above-identified patent and that said Letters Patent is hereby corrected as shown below:

On the Title Page, Item (57), under "ABSTRACT", in Column 2, Line 10, delete "trough" and insert -- through --, therefor.

In the Specifications:

In Column 1, Line 60, delete "then" and insert -- than --, therefor.

In Column 2, Line 31, delete "present" and insert -- presents --, therefor.

In Column 3, Line 51, delete "it self" and insert -- itself --, therefor.

In Column 3, Line 53, delete "field," and insert -- field --, therefor.

In Column 6, Line 16, delete "there" and insert -- their --, therefor.

Signed and Sealed this  
Fourteenth Day of May, 2013

Teresa Stanek Rea  
*Acting Director of the United States Patent and Trademark Office*